United States Patent [19]

Huang et al.

[11] Patent Number: 5,298,971
[45] Date of Patent: Mar. 29, 1994

[54] LATERAL SHEAR INTERFEROMETER FOR TESTING ASPHERIC SURFACES

[75] Inventors: June-Jei Huang; Chi-Hui Chang, both of Taipei, Taiwan

[73] Assignee: Industrial Technology Research Institute, Hsinchu, Taiwan

[21] Appl. No.: 950,076

[22] Filed: Sep. 23, 1992

[51] Int. Cl.$^5$ .............................................. G01B 9/02
[52] U.S. Cl. .................................. 356/353; 356/359; 356/360; 356/351
[58] Field of Search ............... 356/351, 353, 359, 376, 356/380, 360; 359/638, 833, 834

[56] References Cited

U.S. PATENT DOCUMENTS

4,743,117  5/1988  Kitabayashi et al. ................. 356/353

Primary Examiner—Samuel A. Turner
Assistant Examiner—Robert Kim
Attorney, Agent, or Firm—Ladas & Parry

[57] ABSTRACT

A lateral shear interferometer including a pair of cubic prisms having a diagonal semi-reflective plane as the lateral shear producing element is used to test optical components having aspheric surfaces. An effective aperture is defined by the cubic prisms such that rays propagating therewithin will leave the cubic prisms with a first beam and a second beam propagating divergently with respect to each other. An aperture stop is used to allow only one of the beams to pass therethrough while reject the other. The fringe density of the interference pattern is therefore reduced to be more suitable for analysis. The lateral shear interferometer also provides stable interference patterns as long as a deviation of the light beam incident upon the cubic prisms does not exceeds the limits defined by the effective aperture of the cubic prisms.

2 Claims, 9 Drawing Sheets

LATERAL SHEAR INTERFEROMETER FOR TESTING ASPHERIC SURFACES

BACKGROUND OF THE INVENTION

1. Field of the Invention

The present invention relates to a lateral shear interferometer for use in the testing of optical elements having aspheric surfaces.

2. Description of Prior Art

Optical elements are traditionally made with spherical surfaces which are easy to manufacture and test but are less precise in processing light beams. With the advance of fabrication technologies, optical elements with aspherical surfaces are now easier to made and are gradually replacing the optical elements with spherical surfaces.

Method for testing aspheric surfaces include the Form Talysurf test method, the Ronchi test method, and the interferometry test methods etc. The interferometry testing methods includes shearing interferometer, high density array interferometer, sub-Nyquist analysis method, long wavelength interferometry, two wavelength interferometry, two wavelength holography, sub-region testing method, null optics method, computer generated hologram, and zone plate interferometer etc. For a comprehensive understanding of these methods, interested readers can refer to a technical paper entitled "Interferometry Testing of Aspheric Surfaces" authored by James C. Wyant and published on *SPIE* Vol. 816 *Interferometry Metrology* (1987).

It is a drawback of conventional interferometers that the fringes in an interference pattern are in general too dense to be analyzable. A lateral shear interferometer can be used to overcome this drawback by providing low density fringes. However, the interference patterns produced by using conventional lateral shear interferometers are easily affected by external vibrations so that automated fringe analysis is impossible.

SUMMARY OF THE INVENTION

It is therefore a primary object of the present invention to provide a lateral shear interferometer capable of producing interference patterns with a fringe density suitable for analysis.

It is another object of the present invention to provide a lateral shear interferometer capable of producing stable interference patterns despite external vibrations.

In accordance with the objects of the present invention, there is provided a lateral shear interferometer for testing optical elements having aspheric surfaces. The lateral shear interferometer is provided with a characterized lateral shear producing element which including at least a pair of cubic prisms disposed with a same orientation relative to the beam path. Each of the cubic prisms is provided with at least one semi-reflective plane therewithin such that a ray in the reflected light beam propagating within a predefined range and incident thereupon with an incident angle $\theta_i$ will exit therefrom with a pair of rays having a refraction angle $\theta_r$ equal to the incident angle $\theta_i$. After exiting the second cubic prism, the pair of rays will become four rays, two above the optical axis and parallel to each other and the other two below the optical axis and parallel to each other.

An aperture stop is subsequently arranged, capable of allowing only rays exiting the second cubic prism above the optical axis to pass therethrough while rejecting the others. The interference pattern formed by the rays passing through the aperture stop is subsequently photographed by a CCD camera into digital image signals that can be processed by a computer system running an interference pattern analysis software package.

BRIEF DESCRIPTION OF THE DRAWINGS

The present invention can be more fully understood by reading the subsequent detailed description of the preferred embodiments thereof with references made to the accompanying drawings, wherein.

DETAILED DESCRIPTION OF THE PREFERRED EMBODIMENTS

Figure 1:
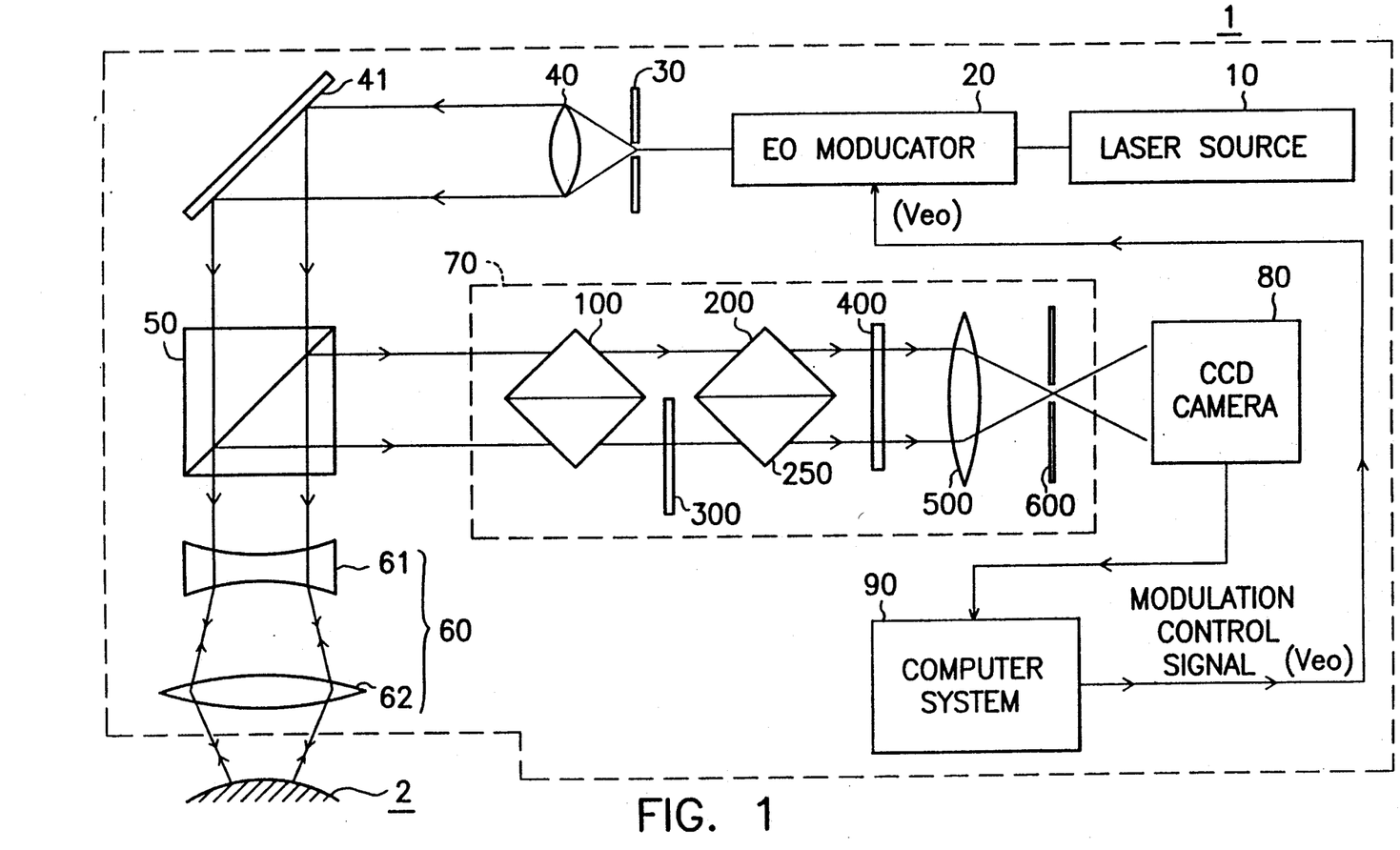
FIG. 1 shows the configuration of a lateral shear interferometer according to the present invention.

Referring to FIG. 1, there is shown a schematic configuration of a lateral shear interferometer 1 devised in accordance with the present invention to test the surface quality of an optical element 2. The lateral shear interferometer 1 includes a laser source 10, an electro-optical (EO) modulator 20, a spatial filter 30, a collimating lens 40, a reflector 41, a cubic splitter 50, a focusing lens set 60 consisting of a diverging lens 61 and a converging lens 62, a lateral shear producing element 70, a CCD camera 80, and a computer system 90 running an interference pattern analysis program.

The principle axis of the EO modulator 20 is oriented with a 45° angle with respect to the polarization of the laser beam emitted by the laser source 10. The laser beam emitted by the laser source 10 emerges subsequently from the EO modulator 20 with a phase shift between the S and P components controlled by a DC voltage $V_{EO}$. The phase-shifted laser beam thereafter passes through the spatial filter 30, the collimating lens 40, the cubic splitter 50, and the a focusing lens set 60 to the optical component 2 under testing. A reflection of the laser beam is then guided by the focusing lens set 60 and the cubic splitter 50 to the lateral shear producing element 70. The lateral shear producing element 70 is a particular feature of the present invention, which is comprised of a first cubic prism 100, a second cubic prism 200, a half-wave plate 300, a polarizer 400, a converging lens 500, and an aperture stop 600.

In the lateral shear interferometer 1 of FIG. 1, the laser source 10 generates a coherent light beam which is guided subsequently to the optical element 2 under test. The light beam incident upon the surface of the optical element 2 under test is thereby reflected back through the lens set 60 and the cubic splitter 50 to the lateral shear producing element 70.

The first cubic prism 100 and the second cubic prism 200 are constructed with an identical structure, each of which are provided with a diagonal semi-reflective plane, as designated respectively by the reference numerals 150 and 250, and a same refractive index n. The first cubic prism 100 and the second cubic prism 200 are disposed with their semi-reflective planes 150, 250 aligned with a small angle $\beta$ relative to the optical axis of the reflected light beam (not obviously shown in the illustration of FIG. 1).

Figure 2A:
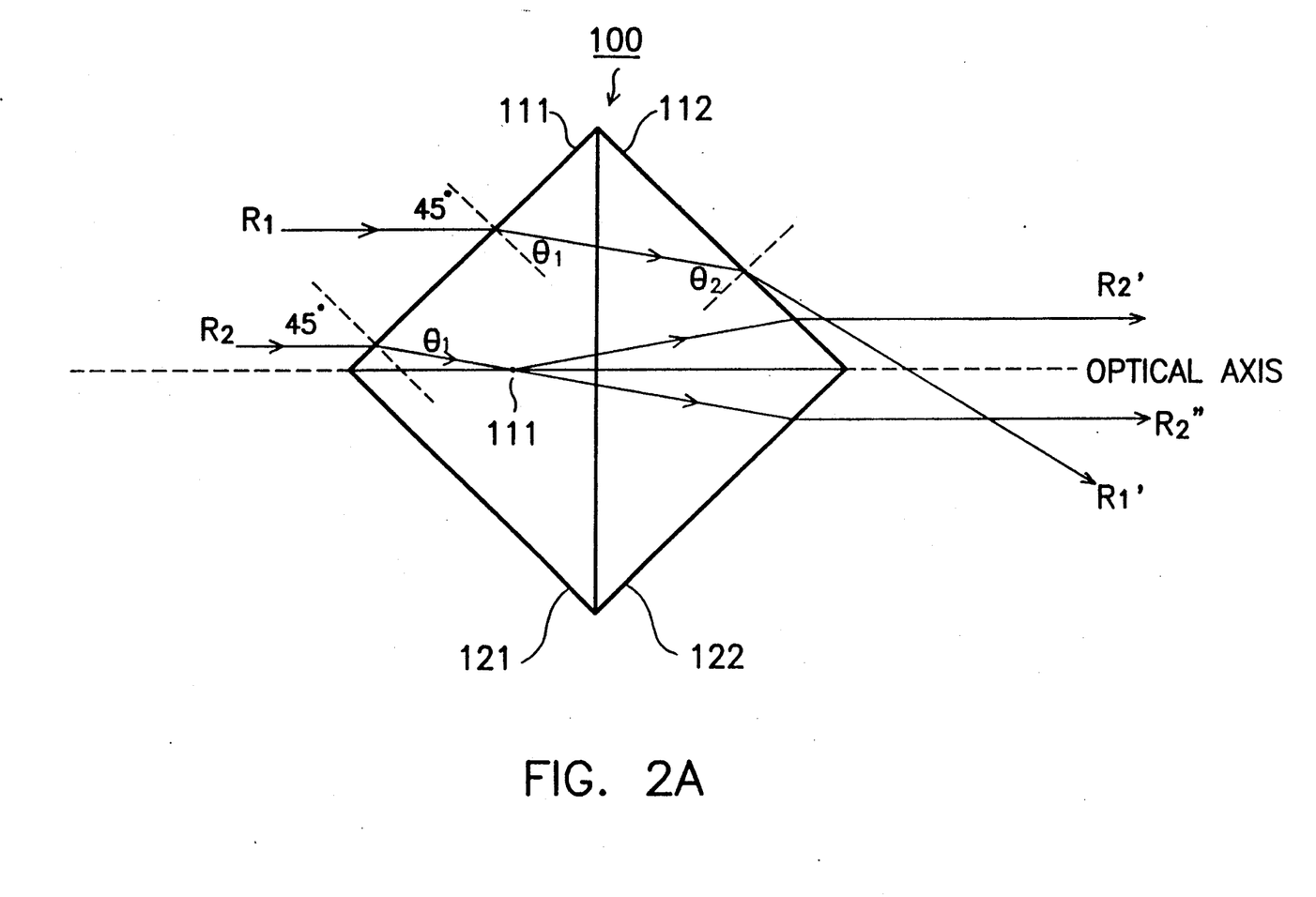
FIG. 2A is a schematic illustration utilized to show propagation paths of rays incident upon a cubic prism employed in the lateral shear interferometer of FIG. 1.

Referring to FIG. 2A, the first cubic prism 100 is shown alone with the semi-reflective plane 150 thereof aligned in coincident with the optical axis of the reflected light beam. The first cubic prism 100 has four side faces, an upper front side 111, an upper back side 112, a bottom front side 121, and a bottom back side 122.

Rays travelling along the optical axis and incident upon the front sides 111, 121 of the first cubic prism 100 shown in FIG. 2A will propagate within the first cubic prism 100 either without encountering the semi-reflective plane 150 as, for example, a ray designated by $R_1$, or with encountering the semi-reflective plane 150 as, for example, another ray designated by $R_2$.

The ray $R_1$ that does not encounter the semi-reflective plane 150 exits the first cubic prism 100 after undergoing two refractions, one with the upper front side 111 of the first cubic prism 100 and the other with the upper back side 112 of the same. As a result of the refractions, the propagation direction of the ray $R_1$ after exiting the first cubic prism 100 is deflected from the optical axis.

On the other hand, the ray $R_2$ that encounters the semi-reflective plane 150 of the first cubic prism 100 is split by the same into two light rays as designated by $R_2'$ and $R_2''$. The ray $R_2'$ is formed by a reflection of a portion of the ray $R_2$ by the semi-reflective plane 150, and the ray $R_2''$ is formed by a transmission of the other portion of the same ray $R_2$ through the semi-reflective plane 150. The two split rays $R_2'$, $R_2''$ exit the first cubic prism 100 after one more refraction and propagate in respective paths parallel to and symmetrical about the optical axis.

It can be easily demonstrated that any ray entering into the first cubic prism 100 with an incident angle $\theta$ and encountering subsequently with the semi-reflective plane 150 will exit therefrom with the same angle $\theta$. Such rays are termed to be propagating within "an effective aperture" of the first cubic prism 100.

Figure 2B:
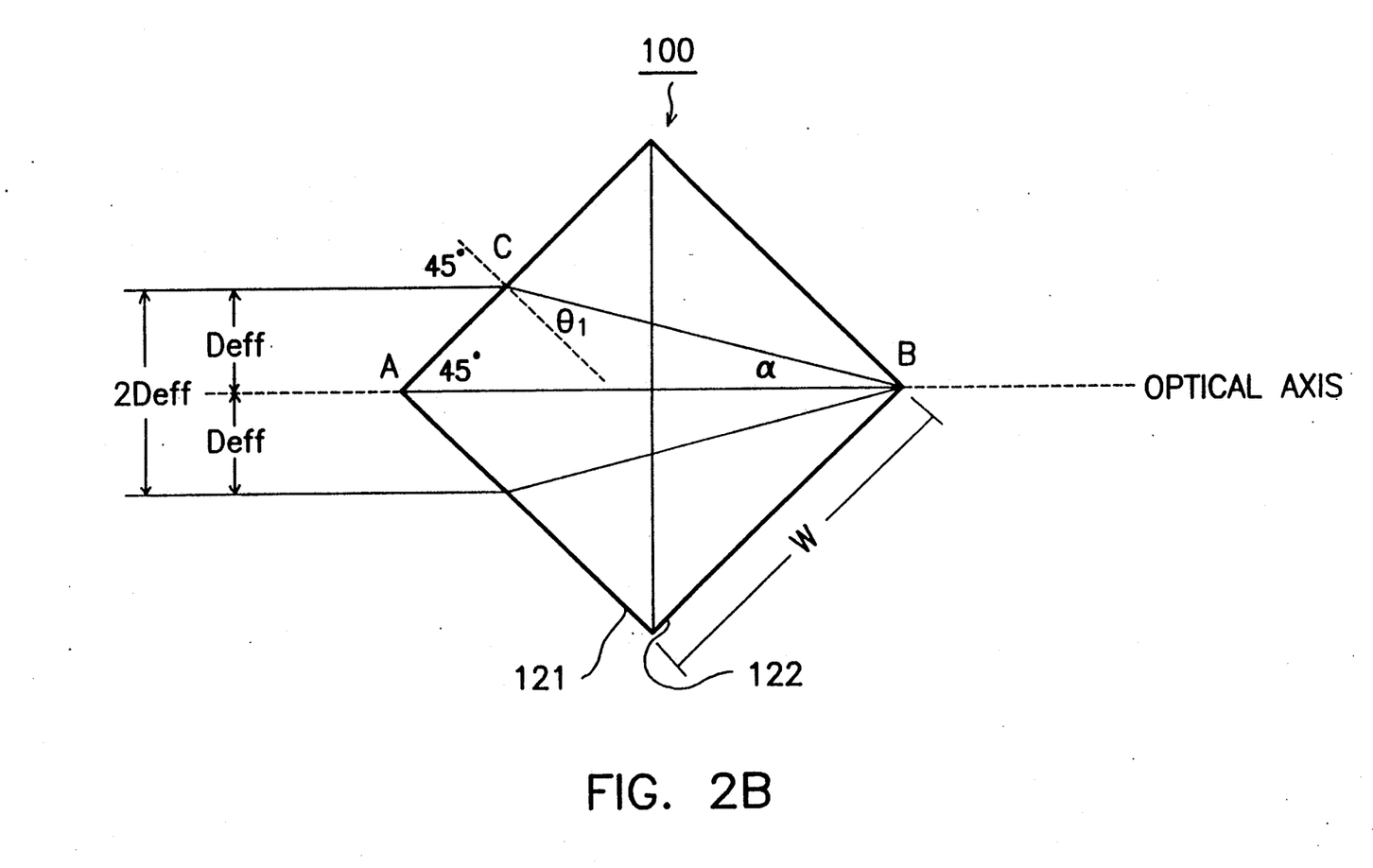
FIG. 2B is a schematic illustration of the cubic prism shown in FIG. 1, utilized particularly to determine an effective aperture of the same.

Referring to FIG. 2B, assume the diameter of the effective aperture of the first cubic prism 100 is $2 \cdot D_{eff}$ and the side length of the same is W, then it is obtained by applying a trigonometric function to the triangle ABC that:

$$\frac{\sqrt{2} \cdot D_{eff}}{\alpha} = \frac{\sqrt{2} \cdot W}{\sin(90° + \theta)} \quad (1)$$

or $$\frac{\sqrt{2} \cdot D_{eff}}{\sin(45° - \theta)} = \frac{\sqrt{2} \cdot W}{\sin(90° + \theta)}$$

where $\theta$ is the refraction angle. It is apparent that the incident angle of the incident light ray is 45° so that it is further obtained by applying the Snell's law that:

$$1 \cdot \sin(45°) = n \cdot \sin(\theta)$$

or $$\sin(\theta) = \frac{1}{n \cdot \sqrt{2}}$$

Accordingly with Eq.(1) and (2), it is obtained that:

$$D_{eff} = \frac{W}{\sqrt{2}} \cdot \left(1 - \frac{1}{(2n^2 - 1)^{\frac{1}{2}}}\right) \quad (3)$$

If the first cubic prism 100 is made of glass having an refractive index n = 1.8, then $D_{eff} = 0.57 \cdot (W/\sqrt{2})$.

Figure 3A:
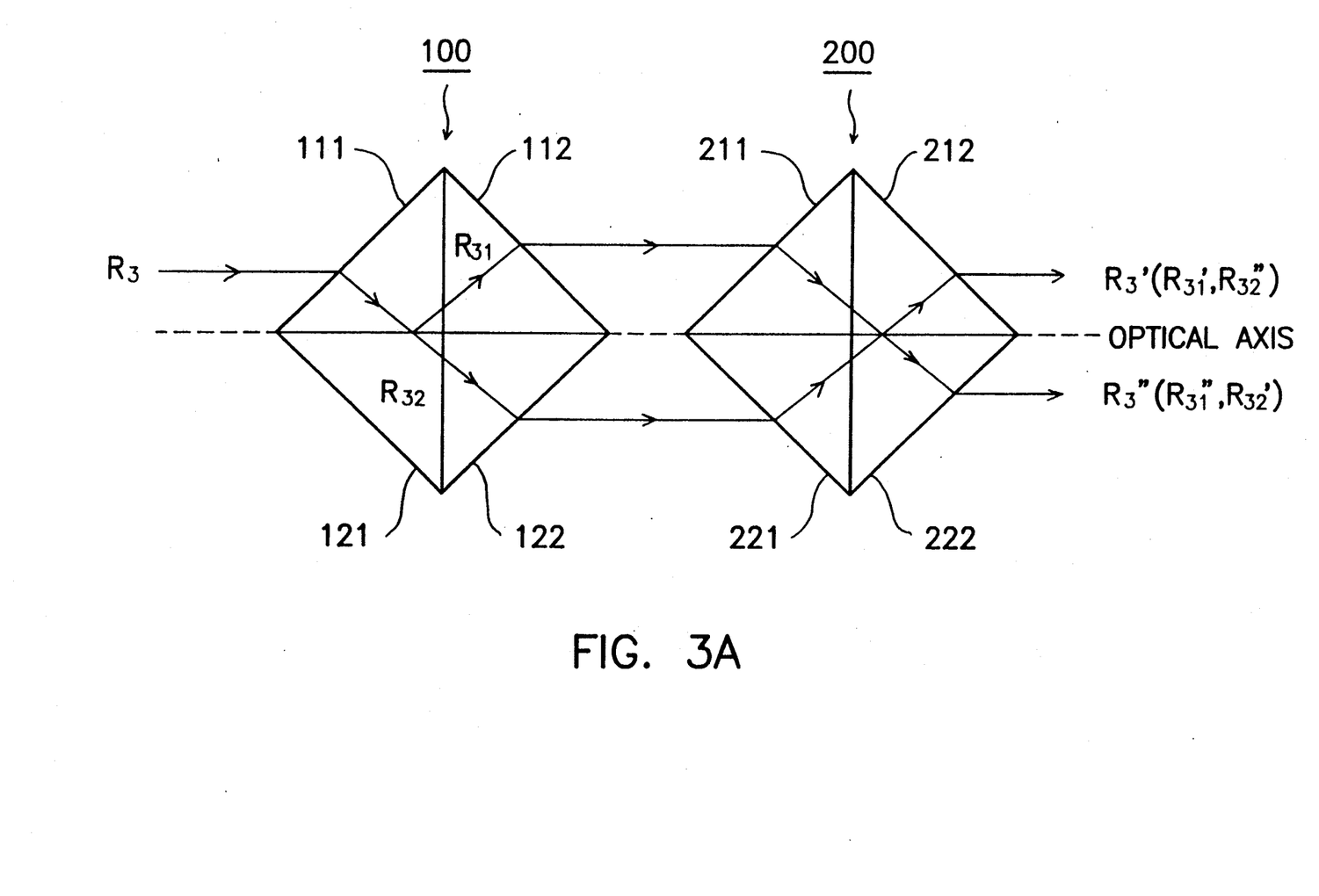
FIG. 3A is a schematic illustration of two cubic prisms arranged with their semi-reflective plane in coincidence with the optical axis of an incident beam, showing in particular the propagation paths of a certain ray of the incident beam.

Referring to FIG. 3A, the two cubic prisms 100, 200 are shown side by side with the semi-reflective planes 150, 250 thereof in coincident with the optical axis. The second cubic prism 200 also has four side faces, an upper front side 211, an upper back side 212, a bottom front side 221, and a bottom back side 222.

A certain ray designated by $R_3$ that propagates within the effective aperture of the first cubic prism 100 is refracted by the upper front side 111 of the first cubic prism 100 and subsequently encounters the semi-reflective plane 150 within the first cubic prism 100 at a point P. The ray $R_3$ is thus split by the semi-reflective plane 150 at the point P into two rays, designated respectively by $R_{31}$ and $R_{32}$. Thereafter, the two split rays $R_{31}$, $R_{32}$ exit the first cubic prism 100 respectively from the upper back side 112 and the bottom back side 122 of the first cubic prism 100. After exiting the first cubic member 100, the two rays $R_{31}$, $R_{32}$ propagate in parallel to each other toward the second cubic prism 200. The propagation paths of the two rays $R_{31}$, $R_{32}$ are symmetrical about the optical axis.

The two rays $R_{31}$, $R_{32}$ are then refracted respectively by the upper front side 211 and the bottom front side 221 of the second cubic prism 200. Subsequent to the refraction, the two rays $R_{31}$, $R_{32}$ meet each other at a point Q on the semi-reflective plane 250 of the second cubic prism 200.

The ray $R_{31}$ is thus split by the semi-reflective plane 250 of the second cubic prism 200 into two rays $R_{31}'$ and $R_{31}''$, and the ray $R_{32}$ is split by the same into two rays $R_{32}'$ and $R_{32}''$. The ray $R_{31}'$ and the ray $R_{32}''$ are superimposed with each other into one single ray designated by $R_3'$; and the ray $R_{31}''$ and the ray $R_{32}'$ are superimposed with each other into another single ray designated by $R_3''$. After exiting the second cubic prism 200, the two rays $R_3'$, $R_3''$ propagate in parallel to the optical axis.

Figure 3B:
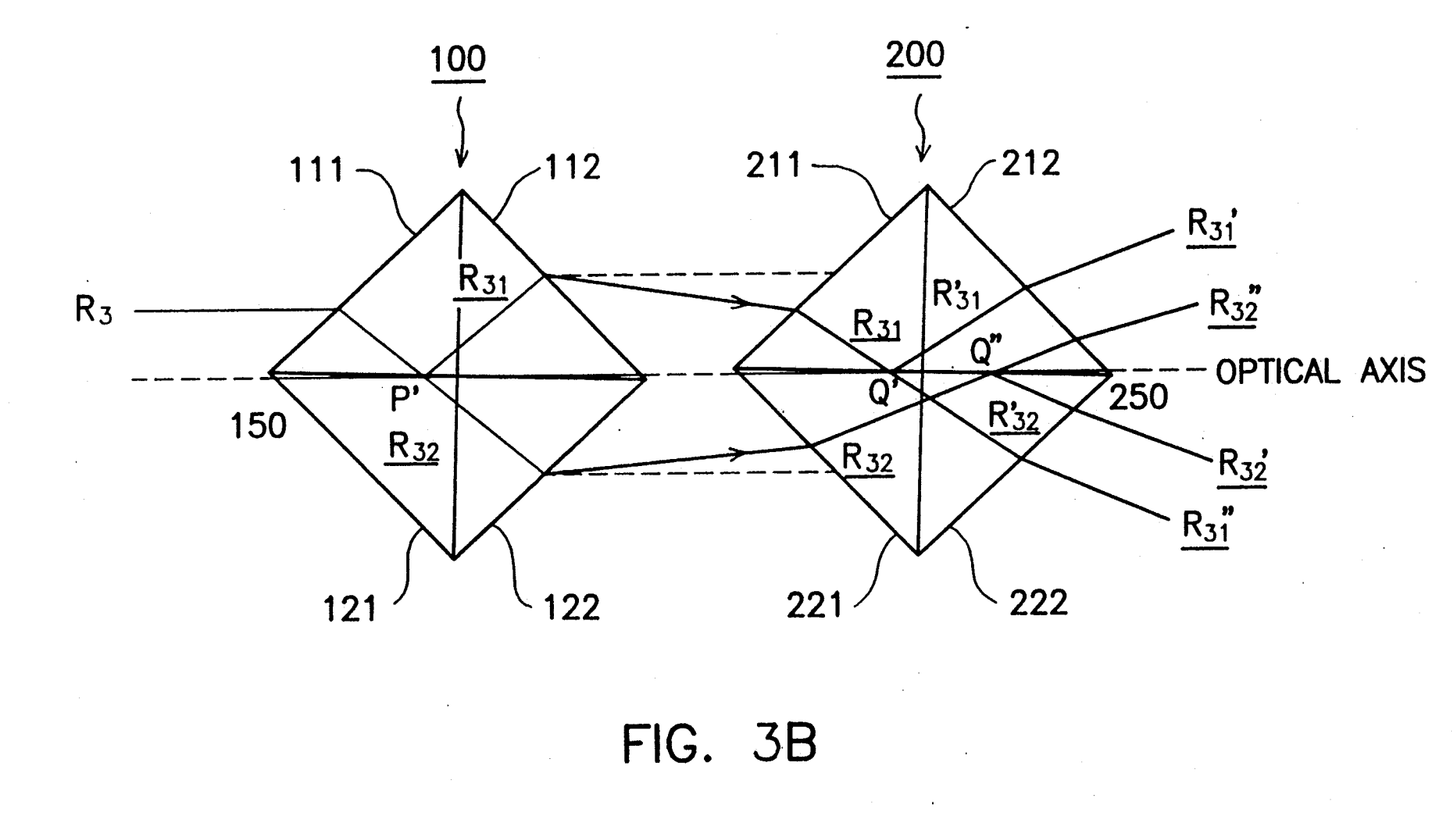
FIG. 3B is a schematic illustration of the same two cubic prisms shown in FIG. 3A except arranged with a same angle $\beta$ with respect to the optical axis of the incident beam, showing in particular a change in the propagation paths of the same incident ray.

Referring to FIG. 3B, if both of the two cubic prisms 100, 200 are slightly rotated so that the semi-reflective planes 150, 250 thereof are inclined with a same angle $\beta$ (in practice the angle $\beta$ is determined empirically) to the optical axis, then the same ray $R_3$ enters into the first cubic prism 100 with an incident angle of 45° + $\beta$. The ray $R_3$ therefore encounters subsequently the semi-reflective plane 150 of the first cubic prism 100 at a point P' shifted backwards from the point P. The ray $R_3$ is therefore split into two rays, as designated respectively by $R_{31}$ and $R_{32}$. The ray $R_{31}$ thereafter encounters the semi-reflective plane 250 of the second cubic prism 200 at a point Q' shifted forward from the point Q and the ray $R_{32}$ meets the same at a point Q'' shifted backwards from the point Q.

The ray $R_{31}$ is thus split by the semi-reflective plane 250 of the second cubic prism 200 into two rays $R_{31}'$ and $R_{31}''$, and the ray $R_{32}$ is split by the same into two rays $R_{32}'$ and $R_{32}''$. The ray $R_{31}'$ and the ray $R_{32}''$ propagate in parallel to each other and which are subsequently refracted by the back upper side 212 of the second cubic prism 200 to the ether; and the ray $R_{31}'$ and the ray $R_{32}'$ propagate in parallel to each other and which are subsequently refracted by the back bottom side 222 of the second cubic prism 200 to the ether. After exiting the second cubic prism 200, the two rays $R_{31}'$, $R_{32}''$ propagate above the optical axis, and while the two rays $R_{31}''$, $R_{32}'$ propagate below the optical axis.

Accordingly with the arrangement of FIG. 3B, it can be seen that all the rays in the reflected light beam whose propagation paths are within the effective aperture will exit the second cubic prism 200 with an upper beam portion emerging from the upper back side 212 of the second cubic prism 200 and a bottom beam portion emerging from the bottom back side 222 of the same. The intensities of the upper beam portion and the bottom beam portion are substantially equal.

Figure 4A:
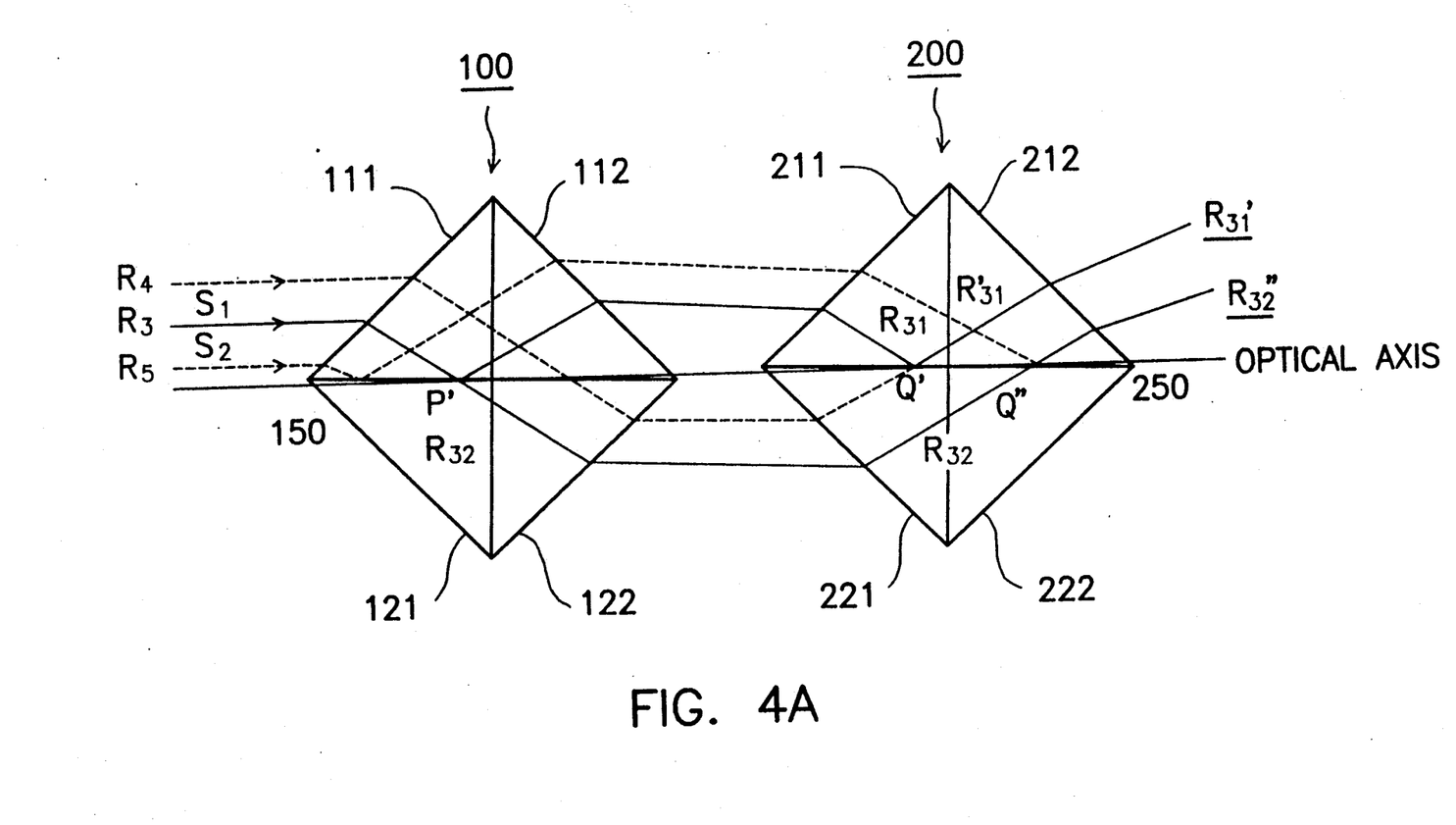
FIGS. 4A–4C are schematic illustrations utilized for the determination of lateral shears in the incident beam.

Referring to FIG. 4A, it can be seen that the ray $R_{31}'$ in the upper beam portion would interfere with a ray that is reflected by the semi-reflective plane 250 at the point Q''. Tracing back from the point Q'', as designated by the dotted lines, it can be found that the ray interfering with the ray $R_{31}'$ is originated from a ray, designated by $R_4$, that is displaced from the ray $R_3$ by a distance. Assume the distance is $S_1$.

It also can be seen that the other ray $R_{32}''$ in the upper beam portion would interfere with another ray that passes through the semi-reflective plane 250 at the point Q'. Tracing back from the point Q', as designated by the dotted lines, it can be found that the ray interfering with the ray $R_{32}''$ is originated from a ray, designated by $R_5$, that is displaced from the ray $R_3$ by a distance. Assume the distance is $S_2$.

Figure 4B:
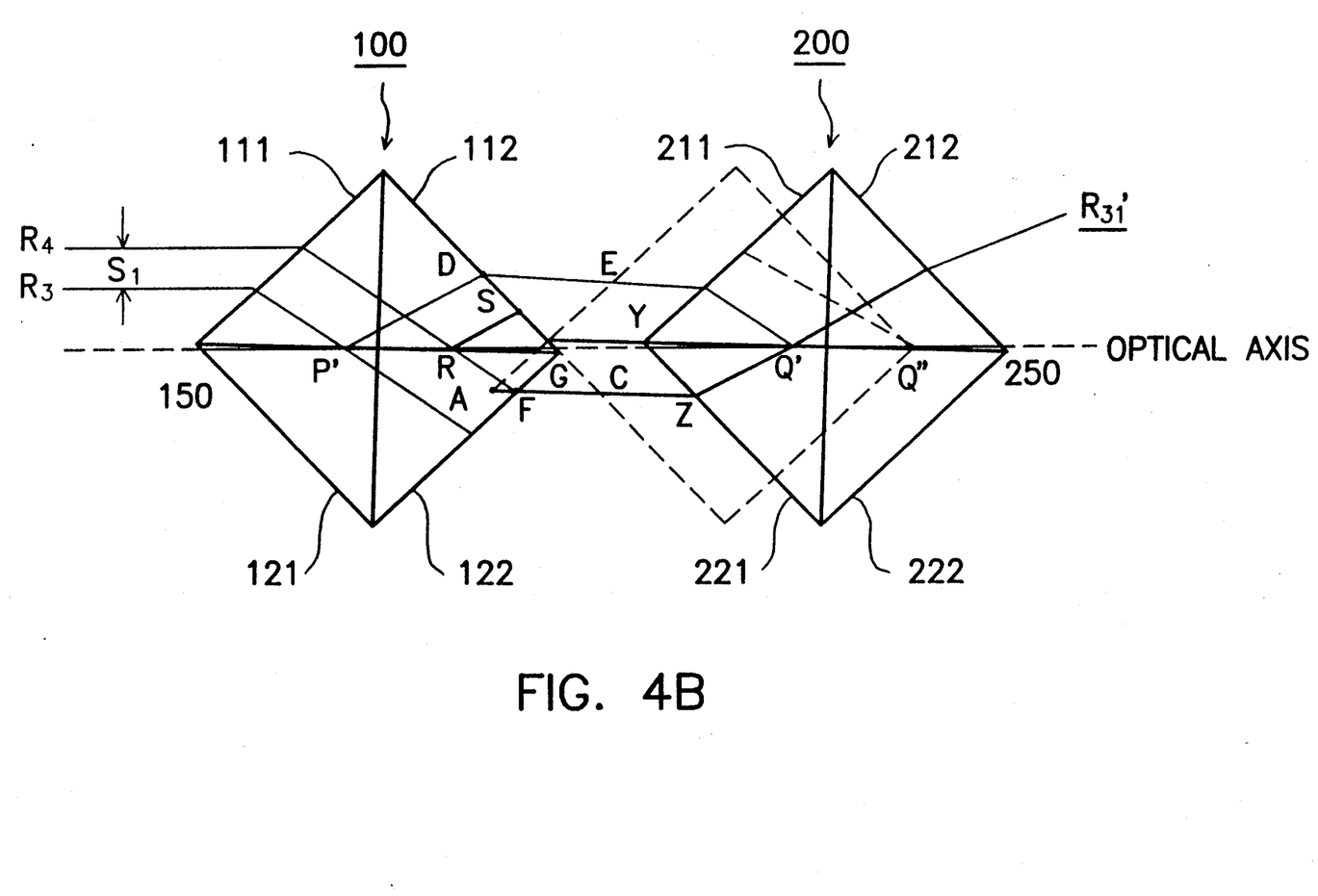

Referring to FIG. 4B, it can be proofed that the distance $S_1$ is equal to the distance $S_2$, and both of which are equal to a constant value that is independent of the propagation path of the ray $R_3$.

Imagine that the second cubic prism 200 is moved left toward the first cubic prism 100 along a plane in coincidence with the semi-reflective plane 250 thereof until it comes into contact with the first cubic prism 100. The thus moved second cubic prism 200 is drawn as a dotted square in FIG. 4B.

Further assume that the semi-reflective plane 150 of the first cubic prism 100 and the semi-reflective plane 250 of the second cubic prism 200 is separated by a distant d, and the center point $O_1$ of the first cubic prism 100 and the center point $O_2$ of the second cubic prism 200 is separated by a distance L. It can be derived by basic trigonometric principles from the drawing of FIG. 4B that:

$$S_1 = RS \cdot \cos(45° + \beta) \quad (4)$$

$$RS = HF \quad (5)$$

$$HF = DS \quad (6)$$

$$\triangle ABC = \triangle DBE \quad (7)$$

$$BG = \sqrt{2} \cdot d \quad (8)$$

$$d = L \cdot \sin(\beta) \quad (9)$$

$$FG/AB = GC/BC \quad (10)$$

$$<BAC = <EDB = 45° - \beta \quad (11)$$

$$DB = AB \quad (12)$$

$$SG = GF \quad (13)$$

$$\tan(<BAC) = \tan(45° - \beta) = BC/AB \quad (14)$$

Accordingly, $$\begin{aligned} S_1 &= RS \cdot \cos(45° + \beta) \\ &= DS \cdot \cos(45° + \beta) \\ &= (DG - SG) \cdot \cos(45° + \beta) \\ &= (DB + BG - SG) \cdot \cos(45° + \beta) \\ &= (AB + \sqrt{2} \cdot d - GF) \cdot \cos(45° + \beta) \end{aligned} \quad (15)$$

Since $$\begin{aligned} FG/AB &= GC/BC \\ &= (BC - BG)/BC \\ &= 1 - BG/BC \\ &= 1 - \sqrt{2} \cdot d/AB \cdot \tan(45° - \alpha) \end{aligned} \quad (16)$$

i.e.

$$FG = AB - \sqrt{2} \cdot d/\tan(45 - \alpha) \quad (17)$$

Substitute (17) into (15), $$\begin{aligned} S_1 &= (AB + \sqrt{2} \cdot d - AB + \sqrt{2} \cdot d/\tan(45° - \alpha)) \cdot \cos(45° + \beta) \\ &= \sqrt{2} \cdot d \cdot (1 + 1/\tan(45° - \alpha)) \cdot \cos(45° + \beta) \\ &= \sqrt{2} \cdot d \cdot \left(1 + \frac{1 + \tan(\beta)}{1 - \tan(\beta)}\right) \cdot \\ &\quad \left(\frac{1}{\sqrt{2}} \cdot \cos(\beta) - \frac{1}{\sqrt{2}} \cdot \sin(\beta)\right) \\ &= d \cdot \frac{2}{1 - \tan(\beta)} \cdot [\cos(\beta) - \sin(\beta)] \\ &= 2 \cdot d \cdot \cos(\beta) \\ &= 2 \cdot L \cdot \sin(\beta) \cdot \cos(\beta) \\ &= L \cdot \sin(2\beta) \end{aligned} \quad (18)$$

Since L is a fixed constant depending on the separation distance of the two cubic prisms 100, 200, and $\beta$ is also a constant depending on the orientation of the same, $S_1$ is accordingly a constant value independent of the propagation path of the ray $R_3$.

Figure 4C:
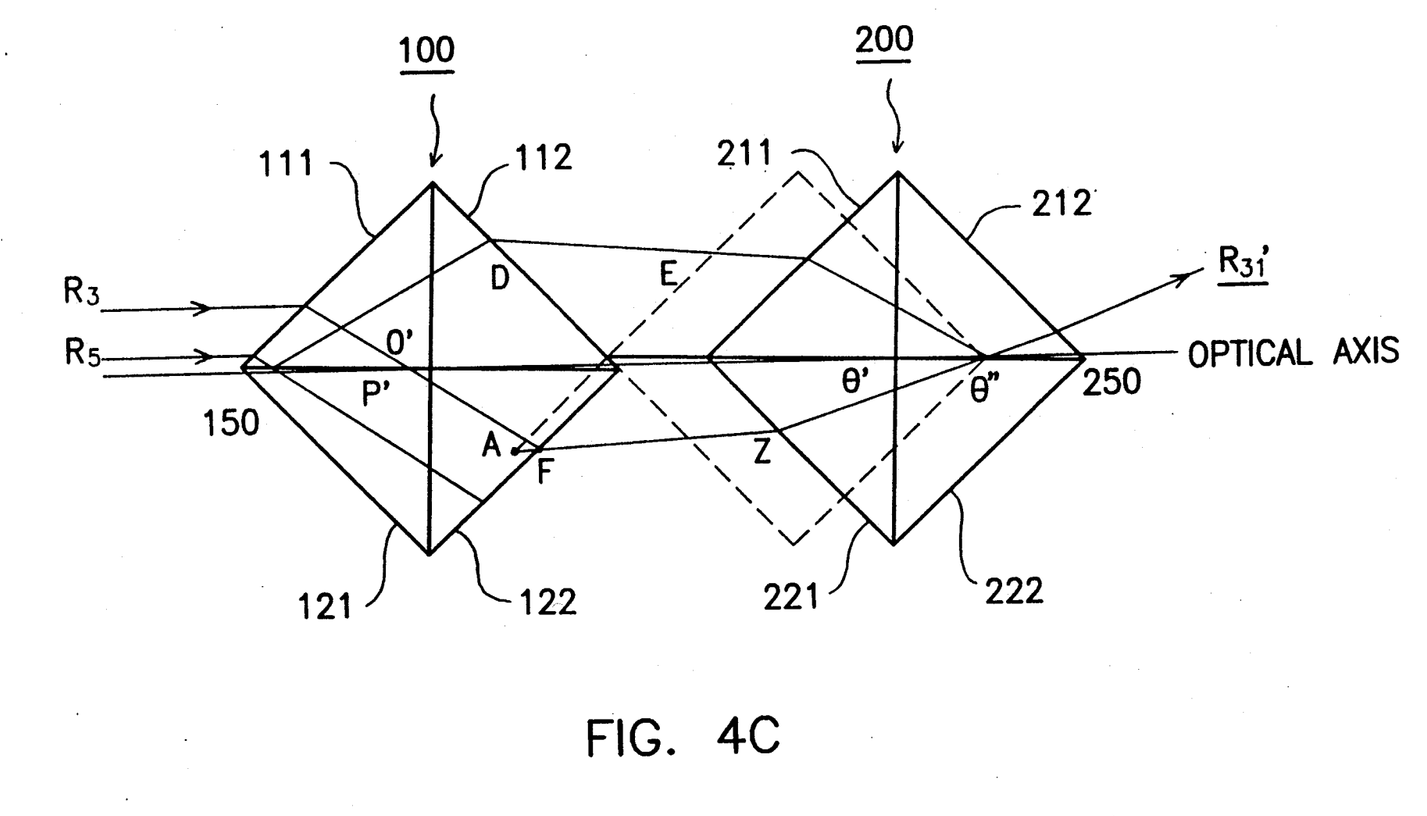

It also can be proofed with the drawing of FIG. 4C that $S_2$ is also equal to $L \cdot \sin(2\beta)$. The geometrical figures of FIG. 4C looks substantially the same as that shown in FIG. 4B and therefore same mathematical inductions can be made to deduce that $S_2 = L \cdot \sin(2\beta)$.

As a general rule, any ray propagating within the effective aperture of the first cubic prism 100 will eventually produce a split ray interfering with another split ray originated from another ray separated within the effective aperture by a distance L·sin(2β). The distance L·sin(2β) is therefore a displacement for the lateral shear of the reflected light beam.

Figure 5:
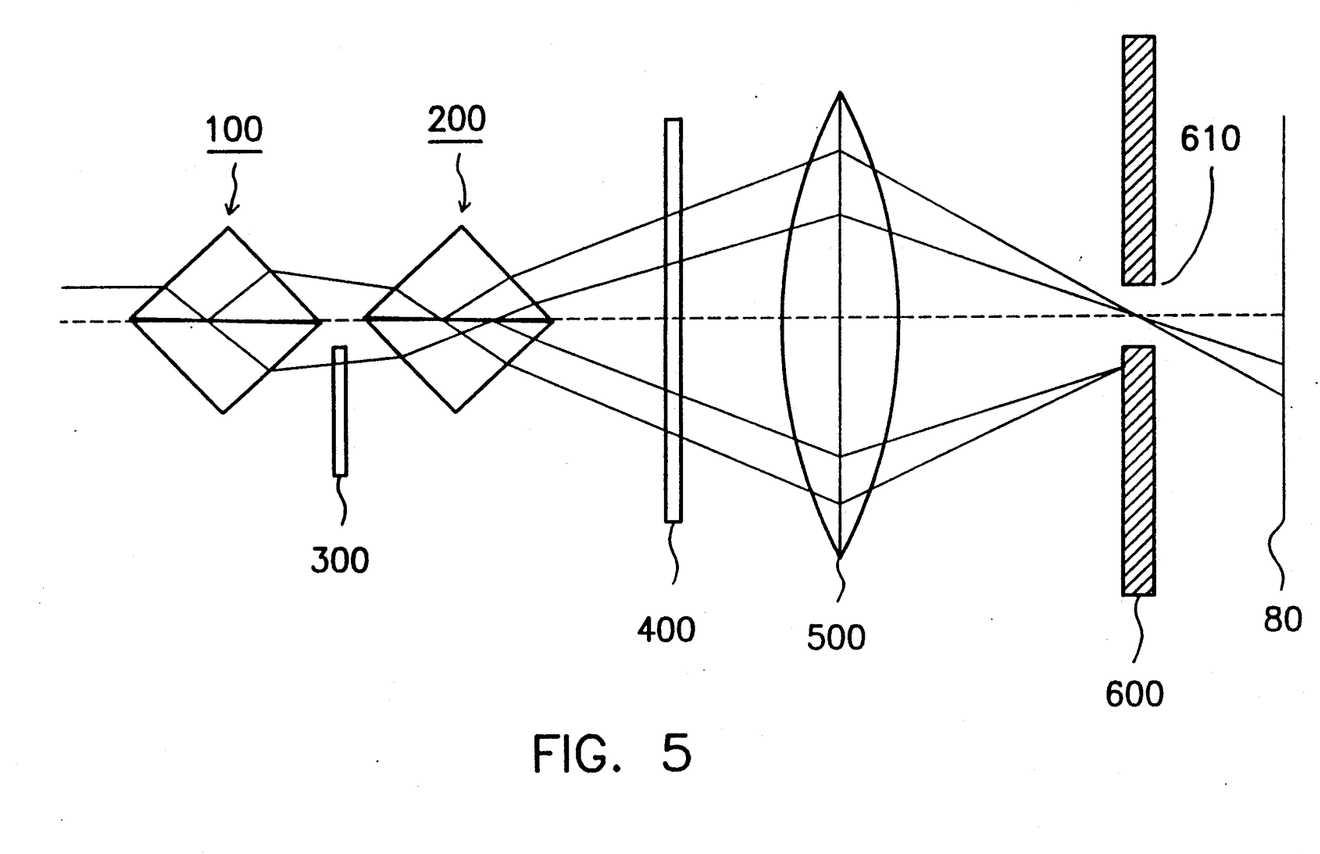
FIG. 5 is a schematic illustration of the lateral shear producing element devised in accordance with the present invention.

Referring to FIG. 5, the light beam exiting the second cubic prism 200 is subsequently focused by a converging lens 500. The converging lens 500 focuses the rays exiting from the upper back side 212 of the second cubic prism 200 at a first point on the focus plane thereof and focuses the rays exiting from the bottom back side 222 of the second cubic prism 200 at a second point on the same. An aperture stop 400 is arranged on the focus plane of the converging lens 500, which has an opening 410 arranged at where the first focus point is located, thereby allowing only the upper portion of the light beam emerging from the second cubic prism 200 to pass therethrough and while rejecting the bottom portion of the same. The lateral shear interference patterns generated by the rays passing through the opening 610 of the aperture stop 600 are photographed by the CCD camera 80 and the photographed digital picture is sent to the computer system 90 to be analyzed.

Referring back to FIG. 1, the two cubic prisms 100, 200 are accordingly used in combination for producing lateral shears to light rays incident thereupon. The half-wave plate 300 is arranged between the bottom back side 122 of the first cubic prism 100 and the bottom front side 221 of the second cubic prism 200, with its axis oriented in parallel to the polarization of the incident reflected light beam. The polarization plate 400 is arranged with a 45° orientation with respect to the polarization of the incident reflected light beam.

When the system is subjected to external vibrations, a particular ray will at one instant enter the first cubic prism 100 at a different entry point due to a shift of the first cubic prism 100. This particular ray and its sheared version nonetheless propagate through the two cubic prisms 100, 200 with non-affected relative paths such that the two rays still exit the second cubic prism 200 at a same point and interfere with each other. The system is therefore stable.

The present invention has been described hitherto with an exemplary preferred embodiment. However, it is to be understood that the scope of the present invention need not be limited to the disclosed preferred embodiment. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A lateral shear interferometer for testing an aspheric surface, comprising:
    (a) means for generating a coherent light beam;
    (b) means for guiding the coherent light beam to the aspheric surface, the coherent light beam incident upon the aspheric surface being reflected back to form a reflected light beam;
    (c) means for guiding the reflected light beam into a beam path;
    (d) a lateral shear producing element including at least a pair of cubic prisms disposed with a same orientation relative to the beam path, each of said cubic prisms having at least one semi-reflective plane arranged therewithin such that a ray in the reflected light beam that propagates within a predefined range and incident thereupon with an incident angle $\theta_i$ will exit therefrom with a pair of rays having a refraction angle $\theta_r$ equal to the incident angle $\theta_i$, said pair cubic prisms being capable of converting rays propagating within the predefined range into a first beam of parallel rays and a second beam of parallel propagating divergently with respect to each other rays, the first beam of parallel rays and the second beam of parallel rays having lateral shear interferences;
    (e) an aperture stop allowing only one of the first beam of rays and the second beam of rays to pass therethrough while rejecting the other; and
    (f) means for analyzing the lateral shear interference pattern formed by the beam of rays passing through said aperture stop.

2. A lateral shear interferometer as set forth in claim 1, wherein said cubic prisms are capable of producing a lateral shear S for rays in the reflected light beam that propagate within the predefined range, where $$S = L \cdot \sin(2\beta),$$

L being the separation distance between the centers of said cubic prisms, and
β being the angle between said semi-reflective planes and the beam path.

* * * * *